(12) United States Patent
Elia et al.

(10) Patent No.: US 9,475,265 B2
(45) Date of Patent: Oct. 25, 2016

(54) COMPOSITE STRUCTURES HAVING IMPROVED HEAT AGING AND INTERLAYER BOND STRENGTH

(75) Inventors: Andri E. Elia, Chadds Ford, PA (US); Olaf Norbert Kirchner, Genolier (CH); Martyn Douglas Wakeman, Gland (CH); Shengmei Yuan, Newark, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 137 days.

(21) Appl. No.: 13/282,525

(22) Filed: Oct. 27, 2011

(65) Prior Publication Data

US 2012/0108123 A1 May 3, 2012

Related U.S. Application Data

(60) Provisional application No. 61/408,166, filed on Oct. 29, 2010, provisional application No. 61/410,093, filed on Nov. 4, 2010, provisional application No. 61/410,100, filed on Nov. 4, 2010, provisional application No. 61/410,104, filed on Nov. 4, 2010, provisional application No. 61/410,108, filed on Nov. 4, 2010.

(51) Int. Cl.

| B32B 27/34 | (2006.01) |
|---|---|
| B32B 5/02 | (2006.01) |
| B32B 5/26 | (2006.01) |
| B32B 27/12 | (2006.01) |
| C08J 5/04 | (2006.01) |
| C08L 77/06 | (2006.01) |

(52) U.S. Cl.
CPC ............... *B32B 27/34* (2013.01); *B32B 5/024* (2013.01); *B32B 5/26* (2013.01); *B32B 27/12* (2013.01); *C08J 5/043* (2013.01); *C08L 77/06* (2013.01); *B32B 2260/023* (2013.01); *B32B 2260/046* (2013.01); *B32B 2262/101* (2013.01); *B32B 2264/10* (2013.01); *B32B 2264/12* (2013.01); *B32B 2307/306* (2013.01); *B32B 2307/308* (2013.01); *B32B 2307/546* (2013.01); *C08J 2377/06* (2013.01); *C08L 2205/02* (2013.01); *Y10T 428/24994* (2015.04); *Y10T 428/249921* (2015.04); *Y10T 428/249924* (2015.04); *Y10T 428/31623* (2015.04); *Y10T 428/31725* (2015.04); *Y10T 428/31728* (2015.04); *Y10T 442/20* (2015.04); *Y10T 442/2041* (2015.04); *Y10T 442/2631* (2015.04); *Y10T 442/2721* (2015.04); *Y10T 442/2762* (2015.04); *Y10T 442/2861* (2015.04); *Y10T 442/2984* (2015.04); *Y10T 442/2992* (2015.04); *Y10T 442/674* (2015.04)

(58) Field of Classification Search
USPC ......... 442/147, 59, 179, 164, 152, 180, 394; 428/474, 435, 221; 427/411, 412; 264/259

See application file for complete search history.

(56) References Cited

U.S. PATENT DOCUMENTS

| 3,920,879 A | 11/1975 | Segal et al. | |
|---|---|---|---|
| 4,255,219 A | 3/1981 | Dellavecchia | |
| 4,268,432 A * | 5/1981 | Maslen et al. | 524/596 |
| 5,492,980 A | 2/1996 | Moriwaki | |
| 5,516,827 A * | 5/1996 | Kaufhold et al. | 524/397 |
| 5,731,375 A | 3/1998 | Park et al. | |
| 5,830,528 A * | 11/1998 | Beall et al. | 427/220 |
| 6,284,830 B1 * | 9/2001 | Gottschalk et al. | 524/449 |
| 6,287,696 B1 * | 9/2001 | Noda et al. | 428/411.1 |
| 7,323,241 B2 | 1/2008 | Myard et al. | |
| 7,763,674 B2 | 7/2010 | Gijsman et al. | |
| 7,811,671 B2 | 10/2010 | Bushelman et al. | |
| 2002/0173584 A1 | 11/2002 | Ebert et al. | |
| 2004/0191451 A1 * | 9/2004 | Doshi | 428/36.91 |
| 2004/0242737 A1 * | 12/2004 | Topulos | 524/115 |
| 2005/0203223 A1 * | 9/2005 | Ohyama et al. | 524/100 |
| 2006/0155066 A1 * | 7/2006 | Crevecoeur et al. | 525/178 |
| 2008/0008879 A1 * | 1/2008 | Elia et al. | 428/339 |
| 2008/0146718 A1 | 6/2008 | Gijsman et al. | |
| 2008/0161503 A1 * | 7/2008 | Chou et al. | 525/386 |
| 2009/0269532 A1 | 10/2009 | Ferreiro et al. | |
| 2010/0120959 A1 | 5/2010 | Qin et al. | |
| 2010/0249307 A1 | 9/2010 | Stoppelmann | |
| 2010/0256262 A1 | 10/2010 | Masaki et al. | |
| 2010/0279111 A1 | 11/2010 | Philipp et al. | |
| 2011/0105655 A1 | 5/2011 | Harder et al. | |

FOREIGN PATENT DOCUMENTS

| FR | 2158422 | 6/1973 |
|---|---|---|
| FR | 2501571 A1 | 9/1982 |
| WO | 2007149300 A1 | 12/2007 |
| WO | 2011014751 A1 | 2/2011 |
| WO | 2011014754 A1 | 2/2011 |

OTHER PUBLICATIONS

Kohan, M.I., "Nylon Plastics Handbook" Hanser, Munich (1995) p. 377-380.

(Continued)

*Primary Examiner* — Lynda Salvatore

(57) ABSTRACT

Disclosed are composite structures having improved heat aging, processes for making them, and end use articles. The composite structures comprise a polyamide matrix resin composition comprising copper based heat stabilizer; a fibrous material and a polyamide surface resin composition comprising surface heat stabilizer; wherein the surface heat stabilizer is different than the copper based heat stabilizer.

10 Claims, No Drawings

(56) References Cited

OTHER PUBLICATIONS

Kohout, J., "Strength Changes of Moulded Polyamide Composite Caused by Thermal Oxidation," Journal of Materials Science, 1999, 34, 843-849.

Database WPI, Week 199131, Thomson Scientific, London, GB: AN 1991-228356 XP002670582, & KR 900004934B (Kolon Co) Jul. 12, 1990 abstract.

Michael Sepe, Nylon 6 & 6/6, Jul. 2008, Canon Communications LLC, Injection Molding Magazine, Part 1.

Nylon, Nov. 12, 2002, Penton Media Inc., Machine Design.

* cited by examiner

COMPOSITE STRUCTURES HAVING IMPROVED HEAT AGING AND INTERLAYER BOND STRENGTH

CROSS REFERENCE TO RELATED APPLICATIONS

The present application claims the benefit of U.S. Provisional Application No. 61/408,166, filed Oct. 29, 2010, the entire disclosure of which is incorporated herein by reference; and U.S. Provisional Application Nos. 61/410,093, filed Nov. 4, 2010; 61/410,100, filed Nov. 4, 2010; 61/410,104, filed Nov. 4, 2010; and 61/410,108, filed Nov. 4, 2010, the entire disclosures of which are incorporated herein by reference.

FIELD OF THE INVENTION

The present invention relates to the field of composite structures having improved heat aging, processes for making them, and end use articles.

BACKGROUND OF THE INVENTION

With the aim of replacing metal parts for weight saving and cost reduction while having comparable or superior mechanical performance, structures based on composite materials comprising a polymer matrix containing a fibrous material have been developed. With this growing interest, fiber reinforced plastic composite structures have been designed because of their excellent physical properties resulting from the combination of the fibrous material and the polymer matrix and are used in various end-use applications. Manufacturing techniques have been developed for improving the impregnation of the fibrous material with a polymer matrix to optimize the properties of the composite structure.

In highly demanding applications, such as for example structural parts in automotive and aerospace applications, composite materials are desired due to a unique combination of light weight, high strength and temperature resistance.

High performance composite structures can be obtained using thermosetting resins or thermoplastic resins as the polymer matrix. Thermoplastic-based composite structures present several advantages over thermoset-based composite structures including the ability to be post-formed or reprocessed by the application of heat and pressure. Additionally, less time is needed to make the composite structures because no curing step is required and they have increased potential for recycling.

Among thermoplastic resins, polyamides are particularly well suited for manufacturing composite structures. Thermoplastic polyamide compositions are desirable for use in a wide range of applications including parts used in automobiles, electrical/electronic parts, household appliances and furniture because of their good mechanical properties, heat resistance, impact and chemical resistance and because they may be conveniently and flexibly molded into a variety of articles of varying degrees of complexity and intricacy.

With the aim of improving the manufacturing process for making composite structures and integrated composite structures and allowing an easier, shorter and uniform mixing or impregnation of fibrous materials, several ways have been developed to decrease the melt viscosity of the polymer matrix. By having a low melt viscosity, polymer compositions flow faster and are thus easier to process. By reducing the melt viscosity of the polymer matrix, the time needed to reach the desired degree of mixing may be shortened, thereby increasing the overall manufacturing speed and thus leading to increased productivity.

However, the use of a low melt viscosity polyamide composition for improving or accelerating the mixing or impregnation of fibrous materials may lead to composite structures that are not ideal for highly demanding applications such as the automotive field due to inferior mechanical and heat aging properties.

The addition of heat stabilizers to polymer matrix compositions can allow for a higher impregnation temperature which lowers the viscosity of the polymer matrix composition but these heat stabilizers can also interfere with adhesion of the overmolding resin.

U.S. Pat. No. 7,763,674 discloses a fiber reinforced polyamide composition heat stabilized with a copper iodide/potassium iodide mixture.

US 2010/0120959 discloses polyamide compositions comprising a transition metal ion-modified clay as a heat-stabilizer. The metal ion for use in modifying the clay is a transition metal selected from the transition metals in Group IB, VIIB, VIIB and VIII of the Periodic Table and combinations thereof.

US 2009/0269532 teaches a multilayer structure comprising at least one stabilized layer. The stabilized layer is stabilized with 0.5% stabilizer based on copper iodide and potassium iodide. This stabilizer is constituted of 10% copper iodide, 80% potassium iodide and 10% zinc stearate.

US 2008/0146718 discloses a non-fibrous-reinforced thermoplastic molding composition comprising a metal powder as a heat stabilizer wherein the metal powder has a weight average particle size of at most 1 mm and the metal in the metal powder is selected from the group consisting of elementary metals from Group VB, VIIB, VIIB and VIIIB of the Periodic Table, and mixtures thereof.

U.S. Pat. No. 7,811,671 discloses films which comprise polyamide compositions which use potassium iodide and cuprous iodide with a magnesium stearate binder as a heat stabilizer.

FR 2,158,422 discloses a composite structure made of a low molecular weight polyamide matrix and reinforcing fibers. Due to the low molecular weight of the polyamide, the polyamide has low viscosity. The low viscosity of the polyamide matrix allows an efficient impregnation of the reinforcing fibers.

U.S. Pat. No. 7,323,241 discloses a composite structure made of reinforcing fibers and a branched polyamide resin having a star structure. The disclosed polyamide having a star structure is said to exhibit a high fluidity in the molten state thus making possible a good impregnation of the reinforcing fibers so as to form a composite structure having good mechanical properties.

WO 2007/149300 discloses a semi-aromatic polyamide composite article comprising a component comprising a fiber-reinforced material comprising a polyamide matrix composition, an overmolded component comprising a polyamide composition, and an optional tie layer there between, wherein at least one of the polyamide compositions is a semi-aromatic polyamide composition However, there is still a need for a composite structure comprising a matrix resin composition that can rapidly and efficiently impregnate a fibrous material and wherein the composite structure exhibits good long-term heat stability.

SUMMARY OF THE INVENTION

There is disclosed and claimed herein a composite structure and an overmolded composite structure comprising a combination of heat stabilizers.

The composite structure comprises:
a polyamide matrix resin composition comprising
from 0.1 to at or about 3 weight percent of a copper based heat stabilizer based on the weight of the polyamide matrix resin composition;
a fibrous material selected from woven or non-woven structures, felts, knits, braids, textiles, fibrous battings or mats, and combinations of these;
and
a polyamide surface resin composition comprising
0.1 to 3 weight percent of surface heat stabilizer based on the weight of the polyamide surface resin composition;
wherein:
the surface heat stabilizer is different than the copper based heat stabilizer; and
the fibrous material is impregnated with the polyamide matrix resin composition.

Preferably, in the composite structures of the invention, the surface heat stabilizer is selected from dipentaerythritol, tripentaerythritol, pentaerythritol and mixtures of these. More preferably, the surface heat stabilizer is selected from dipentaerythritol.

In a second aspect, the invention provides articles prepared from the composite structures of the invention.

In yet another aspect, the invention discloses and claims a process to manufacture the composite structure of the invention.

In yet another aspect, the invention discloses and claims overmolded composite structures and a process to manufacture the overmolded composite structure.

DETAILED DESCRIPTION

The composite structures according to the present invention offer good thermal stability during their manufacture, good heat aging properties, retention of mechanical properties after long-term high temperature exposure.

For making overmolded composite structures and to increase the performance of polymers, it is often desired to "overmold" one or more polymer compositions onto the top portion, or all of the surfaces of a component so as to surround or encapsulate the component structure. Overmolding involves molding a second polymer (second component) directly onto one or more surfaces of the component structure (first component) to form an overmolded composite structure, wherein the first component and second component are adhered one to the other at least at one interface to make an overmolded composite structure. The first component can be a composite structure and the first component can comprise various polymeric and fibrous materials. The polymer compositions of this invention used to impregnate fibrous materials of the first component or composite structure (i.e. the matrix polymer composition) are different compositions from the resin(s) which comprise the surface of the first component or composite structure (i.e. surface resin composition) but they may comprise the same polyamide polymer. The first component or composite structure and the second component of the overmolded composite structure are desired to have good adhesion to each other. The composite structure and/or overmolded composite structure are desired to have good dimensional stability and retain their mechanical properties under adverse conditions, including thermal cycling.

Polyamides are excellent examples of polymers that can be used to make composite structures or overmolded composite structures due to their excellent mechanical properties. Unfortunately, polyamide compositions may suffer from an unacceptable deterioration of their mechanical properties during their manufacture and upon long-term high temperature exposure during use and therefore, they may be non-ideal for making overmolded composite structures used in highly demanding applications such as the automotive field. Indeed, there is a current and general desire in the automotive field to have high temperature resistant, lightweight structures. Such high temperature resistant structures are required to maintain their mechanical properties when they are exposed to temperatures higher than 120° C. or even higher than 200° C., such as those often reached in underhood areas of automobiles or to maintain their mechanical properties at an intermediate temperature, such as for example 90° C., for long periods of time. When plastic parts are exposed to such combinations of time and temperature, it is a common phenomenon that the mechanical properties tend to decrease due to the thermo-oxidation of the polymer. This phenomenon is called heat aging.

Unfortunately, the existing technologies fail to combine easy and efficient processability in terms of the impregnation rate of the fibrous material by a polymer with good thermal resistance, good retention of mechanical properties against long-term high temperature exposure, and excellent adhesion to overmolding compositions.

The present invention relates to composite structures and processes to make them. The composite structure according to the present invention comprises at least one polyamide matrix resin impregnated into at least one fibrous material and wherein the polyamide matrix resin comprises a copper based heat stabilizer. The composite structure additionally comprises a polyamide surface resin composition comprising a surface heat stabilizer. Preferably, the surface heat stabilizer is selected from dipentaerythritol, tripentaerythritol, pentaerythritol and mixtures of these and even more preferably, the surface heat stabilizer is dipentaerythritol. The polyamide used in the polyamide matrix resin composition and the polyamide surface resin composition can be the same polyamide or different polyamides or blends of two or more polyamides.

The second component used to overmold the first component or composite structure is a polyamide resin composition optionally comprising a copper based heat stabilizer and optionally comprising a reinforcing agent.

DEFINITIONS

As used throughout the specification, the phrases "about" and "at or about" are intended to mean that the amount or value in question may be the value designated or some other value about the same. The phrase is intended to convey that similar values promote equivalent results or effects according to the invention.

As used herein, the term "overmolded composite structure" means a structure comprising a first component or a composite structure and a second component. The second component is overmolded onto the first component or composite structure to make the overmolded composite structure.

As used herein, the term "first component" or "composite structure" means a composition comprising at least one polyamide matrix resin composition, at least one fibrous material, and a polyamide surface resin composition. The polyamide surface resin composition is the outermost surface of the entire surface of the first component, or composite structure, or only a portion of the surface of the first component or composite structure depending on what percentage of the first component surface or composite structure surface is to be overmolded. The polyamide surface resin composition can be the outermost top, the outermost bottom, or both the outermost top and outermost bottom surfaces of the first component or composite structure.

As used herein, the term "polyamide matrix resin" means the polyamide resin composition that is used to impregnate the fibrous material.

As used herein, the term "surface heat stabilizer" means a stabilizer used in the polyamide surface resin composition. The surface heat stabilizer is not a copper based heat stabilizer and does not contain copper or copper ions.

As used herein, the term "fibrous material" means a material that is any suitable mat, fabric, or web form known to those skilled in the art. The fibers or strands used to form the fibrous material are interconnected (i.e. at least one fiber or strand is touching at least one other fiber or strand to form a continuous material) or touching each other so that a continuous mat, web or similar structure is formed.

As used herein, the term "polyamide surface resin" means a polyamide composition which comprises the outer surface of the first component or composite structure. The polyamide surface resin composition can comprise the entire outer surface of the first component or composite structure or a portion of the outer surface of the first component or composite structure depending on the end use.

As used herein, the term "copper based heat stabilizer" means a heat stabilizer that comprises a copper halide compound and a alkali metal halide compound or combinations of different copper halides or alkali metal halides.

As used herein, the term "second component" or "overmolding component" means a composition comprising a polyamide resin composition and optionally a reinforcing agent. The second component is used to overmold the first component or composite structure.

As used herein, the term "overmolded" means molding and casting processes used to overmold a substrate, structure, or article with a polymeric composition. It is the process of molding over a substrate, structure, article, wherein the overmolding polymeric composition is bonded to and becomes an integral part of the substrate, structure, or article (i.e. the exterior part) upon cooling.

As used herein, the term "impregnated" means the polyamide matrix resin composition flows into the cavities and void spaces of the fibrous material As used herein, the term "bond strength" means the strength of the bond between the first component or composite structure and second component or overmolding component of the overmolded composite structure.

As used herein, the term "heat aging" means exposing the component structure, the composite structure and/or the overmolded composite structure to elevated temperatures for a given period of time.

As used herein, the term "high temperature long-term exposure" refers to a combination of exposure factors, i.e. time and temperature. Polymers which demonstrate heat aging performance under lab conditions or under conditions of the lifetime of the polymers such as those reached in underhood areas of automobiles (e.g. at a temperature at or in excess of 120° C., preferably at or in excess of 160° C., more preferably at or in excess of 180° C. and still more preferably at or in excess of 200° C. and the aging or exposure being at or in excess of 500 hours and preferably at or in excess of 1000 hours) can be shown to exhibit similar performance at lower temperatures for a much longer period of aging or exposure. The temperature dependence of the rate constants of polymer degradation is known from the literature such as for example in Journal of Materials Science, 1999, 34, 843-849, and is described by Arrhenius law; as an example aging at 180° C. for 500 hours is more-or-less equivalent to aging at 80° C. for 12 years.

First Component or Composite Structure

The first component or composite structure comprises one or more fibrous materials impregnated with one or more polyamide matrix resin compositions and comprises one or more surface resin compositions. The first component or composite structure can have a total thickness of from about 50 to 20000 microns, preferably from about 50 to 5000 microns, more preferably from about 500 to 3000 microns, and most preferably from about 800 to 2000 microns. The first component or composite structure can have multiple fibrous materials.

The polyamide surface resin composition may be both the top and bottom surface of the first component or composite structure (essentially completely encapsulating the first component or composite structure). Such a composition may be useful when it is desired to encapsulate or overmold the entire surface of the first component or composite structure with the second component. The polyamide surface resin composition may also be only the top or bottom surface, or a portion of the top or bottom surface of the first component or composite structure depending on what percentage of the first component surface or composite structure surface is to be overmolded.

If the first component or composite structure is to be overmolded only on one surface or part of surface, then the polyamide surface resin composition may be present only on the surface or portion of the surface that is to be overmolded by the second component.

Fibrous Material

The fibrous material impregnated with the polyamide matrix resin composition may be in any suitable mat, fabric, or web form known to those skilled in the art. Suitable examples of such fibrous materials include woven or nonwoven fabrics or mats, unidirectional strands of fiber, and the like and different layers of fibrous material in the first component or composite structure may be formed from different kinds of fibers, mats, or fabrics. The first component or composite structure may contain multiple layers of fibrous materials which are impregnated with one or more polyamide matrix resin compositions. Additionally, any given fibrous layer may be formed from two or more kinds of fibers (e.g., carbon and glass fibers). The fibers may be unidirectional, bi directional, or multidirectional. Preimpregnated unidirectional fibers and fiber bundles may be formed into woven or nonwoven mats or other structures suitable for forming the fibrous material. The fibrous material may be in the form of a unidirectional preimpregnated material or a multiaxial laminate of a preimpregnated material.

The fibrous material is preferably selected from woven or non-woven structures (e.g., mats, felts, fabrics and webs) textiles, fibrous battings, a mixture of two or more materials, and combinations thereof. Non-woven structures can be selected from random fiber orientation or aligned fibrous structures. Examples of random fiber orientation include without limitation material which can be in the form of a mat, a needled mat or a felt. Examples of aligned fibrous structures include without limitation unidirectional fiber strands, bidirectional strands, multidirectional strands, multi-axial textiles. Textiles can be selected from woven forms, knits, braids and combinations thereof.

As used herein, the term "a fibrous material being impregnated with a polyamide matrix resin composition" means that the polyamide matrix resin composition encapsulates and embeds the fibrous material so as to form an interpenetrating network of fibrous material substantially surrounded by the matrix resin composition. For purposes herein, the term "fiber" is defined as a macroscopically homogeneous body having a high ratio of length to width across its cross-sectional area perpendicular to its length. The fiber cross section can be any shape, but is typically round or oval shaped. Depending on the end-use application of the composite structure and/or overmolded composite structure and the required mechanical properties, more than one fibrous material can be used, either by using several of the same fibrous materials or a combination of different fibrous materials. An example of a combination of different fibrous materials is a combination comprising a non-woven structure such as for example a planar random mat which is placed as a central layer and one or more woven continuous fibrous materials that are placed as outside layers or layers above or below or both above and below the central layer. Such a combination allows an improvement of the processing and thereof of the homogeneity of the first component or composite structure thus leading to improved mechanical properties of the composite structure and/or overmolded composite structure. The fibrous material may be made of any suitable material or a mixture of materials provided that the material or the mixture of materials withstand the processing conditions used during the impregnation by the polyamide matrix resin composition and the polyamide surface resin composition and during overmolding of the first component or composite structure by the second component.

Preferably, the fibrous material comprises glass fibers, carbon fibers, aramid fibers, graphite fibers, metal fibers, ceramic fibers, natural fibers or mixtures thereof; more preferably, the fibrous material comprises glass fibers, carbon fibers, aramid fibers, natural fibers or mixtures thereof; and still more preferably, the fibrous material comprises glass fibers, carbon fibers and aramid fibers or mixture mixtures thereof. By natural fiber, it is meant any material of plant origin or of animal origin. When used, the natural fibers are preferably derived from vegetable sources such as for example from seed hair (e.g. cotton), stem plants (e.g. hemp, flax, bamboo; both bast and core fibers), leaf plants (e.g. sisal and abaca), agricultural fibers (e.g., cereal straw, corn cobs, rice hulls and coconut hair) or lignocellulosic fiber (e.g. wood, wood fibers, wood flour, paper and wood-related materials). As mentioned above, more than one fibrous materials can be used. A combination of fibrous materials made of different fibers can be used such as for example a first component or composite structure comprising one or more central layers made of glass fibers or natural fibers and one or more outer layers (relative to central layer) made of carbon fibers or glass fibers. Preferably, the fibrous material is selected from woven structures, non-woven structures or combinations thereof, wherein said structures are made of glass fibers and wherein the glass fibers are E-glass filaments with a diameter between 8 and 30 µm and preferably with a diameter between 10 to 24 µm. The fibrous material used in the first component or composite structure of the invention cannot be chopped fibers or particles. To be clear, the fibrous material in the first component or composite structure cannot be fibers or particles which are not interconnected to form a continuous mat, web or similar layered structure. In other words, they cannot be independent or single fibers or particles surrounded by the polyamide matrix resin composition.

The fibrous material may further comprise a thermoplastic material, for example the fibrous material may be in the form of commingled or co-woven yarns or a fibrous material impregnated with a powder made of a thermoplastic material that is suited to subsequent processing into woven or non-woven forms, or a mixture for use as a uni-directional material.

Preferably, the ratio between the fibrous material and the polymer materials in the first component or composite structure (i.e. the fibrous material in combination with the matrix resin composition and the surface resin composition), is at least 30 percent fibrous material and more preferably between 40 and 60 percent fibrous material, the percentage being a volume-percentage based on the total volume of the first component structure or composite structure.

Copper Based Heat Stabilizer

The heat stabilizer used in the polyamide matrix resin composition (first component or composite structure) and optionally in the second component is a copper halide based inorganic heat stabilizer. The heat stabilizer comprises at least one copper halide or copper acetate and at least one alkali metal halide. Nonlimiting examples of copper halide include copper iodide and copper bromide. The alkali metal halide is selected from the group consisting of the iodides and bromides of lithium, sodium, and potassium with potassium iodide or bromide being preferred. Preferably, the copper based heat stabilizer is a mixture of 10 to 50 weight percent copper halide, 50 to 90 weight percent potassium iodide, and from zero to 15 weight percent metal stearate. Even more preferably, the copper based heat stabilizer is a mixture of 10 to 30 weight percent copper halide, 70 to 90 weight percent potassium iodide, and from zero to 15 weight percent metal stearate and most preferably the copper based heat stabilizer is a mixture of 10 to 20 weight percent copper halide, 75 to 90 weight percent potassium iodide, and from zero to 12 weight percent metal stearate. An example of a copper based heat stabilizer of the invention is Polyadd P201 from Ciba Specialty Chemicals comprising a blend of 7:1:1 weight ratio (approximately 78:11:11 percent ratio by weight) of potassium iodide, cuprous iodide, and aluminum stearate respectively. A preferred heat stabilizer is a mixture of copper iodide and potassium iodide (CuI/KI). The heat stabilizer is present in an amount from at or about 0.1 to at or about 3 weight percent, preferably from at or about 0.1 to at or about 1.5 weight percent, or more preferably from at or about 0.1 to at or about 1.0 weight percent, the weight percentage being based on the total weight of the polyamide matrix resin composition in the first component or composite structure or based on the total weight of the polyamide resin composition of the second component, as the case may be. The amount of copper halide based heat stabilizer in the polyamide matrix resin composition or the polyamide resin composition of the second component will depend on the anticipated use. If extremely high temperature environments are envisioned, then a higher concentration of copper halide heat stabilizer is needed.

Surface Heat Stabilizer

The surface heat stabilizer of the polyamide surface resin composition is different than the copper based heat stabilizer of the polyamide matrix resin composition. The one or more surface heat stabilizers in the polyamide surface resin composition are present in an amount from 0 to at or about 3 weight percent, preferably from at or about 0.1 to at or about 3 weight percent, more preferably from at or about 0.1 to at or about 1 weight percent, or more preferably from at or about 0.1 to at or about 0.7 weight percent, the weight percentage being based on the total weight of the polyamide surface resin composition in the first component or composite structure.

The surface heat stabilizer used in the polyamide surface resin composition can be any heat stabilizer as long as it is not a copper halide based heat stabilizer. Heat stabilizers useful in the polyamide surface resin composition include polyhydric alcohols having more than two hydroxyl groups. The one or more polyhydric alcohols may be independently selected from aliphatic hydroxylic compounds containing more than two hydroxyl groups, aliphatic-cycloaliphatic compounds containing more than two hydroxyl groups, cycloaliphatic compounds containing more than two hydroxyl groups and saccharides containing more than two hydroxyl groups.

An aliphatic chain in the polyhydric alcohol can include not only carbon atoms but also one or more hetero atoms which may be selected, for example, from nitrogen, oxygen and sulphur atoms. A cycloaliphatic ring present in the polyhydric alcohol can be monocyclic or part of a bicyclic or polycyclic ring system and may be carbocyclic or heterocyclic. A heterocyclic ring present in the polyhydric alcohol can be monocyclic or part of a bicyclic or polycyclic ring system and may include one or more hetero atoms which may be selected, for example, from nitrogen, oxygen and sulphur atoms. The one or more polyhydric alcohols may contain one or more substituents, such as ether, carboxylic acid, carboxylic acid amide or carboxylic acid ester groups.

Examples of polyhydric alcohols containing more than two hydroxyl groups include, without limitation, triols, such as glycerol, trimethylolpropane, 2,3-di-(2'-hydroxyethyl)-cyclohexan-1-ol, hexane-1,2,6-triol, 1,1,1-tris-(hydroxymethyl)ethane, 3-(2'-hydroxyethoxy)-propane-1,2-diol, 3-(2'-hydroxypropoxy)-propane-1,2-diol, 2-(2'-hydroxyethoxy)-hexane-1,2-diol, 6-(2'-hydroxypropoxy)-hexane-1,2-diol, 1,1,1-tris-[(2'-hydroxyethoxy)-methyl]-ethane, 1,1,1-tris-[(2'-hydroxypropoxy)-methyl]-propane, 1,1,1-tris-(4'-hydroxyphenyl)-ethane, 1,1,1-tris-(hydroxyphenyl)-propane, 1,1,3-tris-(dihydroxy-3-methylphenyl)-propane, 1,1,4-tris-(dihydroxyphenyl)-butane, 1,1,5-tris-(hydroxyphenyl)-3-methylpentane, di-trimethylopropane, trimethylolpropane ethoxylates, or trimethylolpropane propoxylates; polyols such as pentaerythritol, dipentaerythritol, and tripentaerythritol; and saccharides containing more than two hydroxyl groups, such as cyclodextrin, D-mannose, glucose, galactose, sucrose, fructose, xylose, arabinose, D-mannitol, D-sorbitol, D- or L-arabitol, xylitol, iditol, talitol, allitol, altritol, guilitol, erythritol, threitol, and D-gulonic-y-lactone and the like.

Preferred polyhydric alcohols include those having a pair of hydroxyl groups which are attached to respective carbon atoms which are separated one from another by at least one atom. Especially preferred polyhydric alcohols are those in which a pair of hydroxyl groups is attached to respective carbon atoms which are separated one from another by a single carbon atom. Preferably, the one or more polyhydric alcohols comprised in the polyamide surface resin composition described herein are independently selected from pentaerythritol, dipentaerythritol, tripentaerythritol, di-trimethylopropane, D-mannitol, D-sorbitol, xylitol and mixtures thereof. More preferably, the one or more polyhydric alcohols comprised in the polyamide composition described herein are independently selected from dipentaerythritol, tripentaerythritol, pentaerythritol and mixtures thereof. Still more preferably, the one or more polyhydric alcohols comprised in the polyamide surface resin composition described herein are dipentaerythritol and/or pentaerythritol.

The one or more polyhydric alcohols are present in the polyamide surface resin composition described herein from 0.25 weight percent to 15 weight percent, more preferably from 0.5 weight percent to 10 weight percent and still more preferably from 0.5 weight percent to 5 weight percent, the weight percentages being based on the total weight of the polyamide surface resin composition in the first component or composite structure.

Preferably, the one or more polyhydric alcohols comprised in the polyamide composition described herein are dipentaerythritol and/or pentaerythritol and are present in the polyamide surface resin composition described herein from at or about 0.1 to at or about 3 weight percent, more preferably from at or about 0.1 to at or about 1 weight percent, or more preferably from at or about 0.1 to at or about 0.7 weight percent, the weight percentage being based on the total weight of the polyamide surface resin composition in the first component or composite structure.

Polyamide Resins

Polyamide resins used in the manufacture of the composite structure of the invention and/or in the manufacture of the overmolded composite structure are condensation products of one or more dicarboxylic acids and one or more diamines, and/or one or more aminocarboxylic acids, and/or ring-opening polymerization products of one or more cyclic lactams. The polyamide resins are selected from fully aliphatic polyamide resins, semi-aromatic polyamide resins and mixtures thereof. The term "semi-aromatic" describes polyamide resins that comprise at least some aromatic carboxylic acid monomer(s) and aliphatic diamine monomer(s), in comparison with "fully aliphatic" which describes polyamide resins comprising aliphatic carboxylic acid monomer(s) and aliphatic diamine monomer(s).

Fully aliphatic polyamide resins are formed from aliphatic and alicyclic monomers such as diamines, dicarboxylic acids, lactams, aminocarboxylic acids, and their reactive equivalents. A suitable aminocarboxylic acid includes 11-aminododecanoic acid. In the context of this invention, the term "fully aliphatic polyamide resin" refers to copolymers derived from two or more such monomers and blends of two or more fully aliphatic polyamide resins. Linear, branched, and cyclic monomers may be used.

Carboxylic acid monomers useful in the preparation of fully aliphatic polyamide resins include, but are not limited to, aliphatic carboxylic acids, such as for example adipic acid (C6), pimelic acid (C7), suberic acid (C8), azelaic acid (C9), sebacic acid (C10), dodecanedioic acid (C12) and tetradecanedioic acid (C14). Useful diamines include those having four or more carbon atoms, including, but not limited to tetramethylene diamine, hexamethylene diamine, octamethylene diamine, decamethylene diamine, 2-methylpentamethylene diamine, 2-ethyltetramethylene diamine, 2-methyloctamethylene diamine; trimethylhexamethylene diamine and/or mixtures thereof. Suitable examples of fully aliphatic polyamide resins include PA6; PA6,6; PA4,6; PA6,10; PA6,12; PA6,14; P 6,13; PA 6,15; PA6,16; PA11; PA 12; PA10; PA 9,12; PA9,13; PA9,14; PA9,15; PA6,16; PA9,36; PA10,10; PA10,12; PA10,13; PA10,14; PA12,10; PA12,12; PA12,13; PA12,14 and copolymers and blends of the same. Preferred examples of fully aliphatic polyamide resins comprised in the polyamide compositions described herein include PA6; PA11; PA12; PA4,6; PA6,6; PA,10; PA6,12; PA10,10 and copolymers and blends of the same.

Semi-aromatic polyamide resins are homopolymers, copolymers, terpolymers, or higher polymers wherein at least a portion of the acid monomers are selected from one or more aromatic carboxylic acids. The one or more aromatic carboxylic acids can be terephthalic acid or mixtures of terephthalic acid and one or more other carboxylic acids, like isophthalic acid, substituted phthalic acid such as for example 2-methylterephthalic acid and unsubstituted or substituted isomers of naphthalenedicarboxylic acid, wherein the carboxylic acid component preferably contains at least 55 mole percent of terephthalic acid (the mole percent being based on the carboxylic acid mixture). Preferably, the one or more aromatic carboxylic acids are selected from terephthalic acid, isophthalic acid and mixtures thereof and more preferably, the one or more carboxylic acids are mixtures of terephthalic acid and isophthalic acid, wherein the mixture preferably contains at least 55 mole percent of terephthalic acid. Furthermore, the one or more carboxylic acids can be mixed with one or more aliphatic carboxylic acids, like adipic acid; pimelic acid; suberic acid; azelaic acid; sebacic acid and dodecanedioic acid, adipic acid being preferred. More preferably the mixture of terephthalic acid and adipic acid comprised in the one or more carboxylic acids mixtures of the semi-aromatic polyamide resin contains at least 25 mole percent of terephthalic acid. Semi-aromatic polyamide resins comprise one or more diamines that can be chosen among diamines having four or more carbon atoms, including, but not limited to tetramethylene diamine, hexamethylene diamine, octamethylene diamine, nonamethylene diamine, decamethylene diamine, 2-methylpentamethylene diamine, 2-ethyltetramethylene diamine, 2-methyloctamethylene diamine; trimethylhexamethylene diamine, bis(p-aminocyclohexyl)methane; m-xylylene diamine; p-xylylene diamine and/or mixtures thereof. Suitable examples of semi-aromatic polyamide resins include poly(hexamethylene terephthalamide) (polyamide 6,T), poly(nonamethylene terephthalamide) (polyamide 9,T), poly(decamethylene terephthalamide) (polyamide 10,T), poly(dodecamethylene terephthalamide) (polyamide 12,T), hexamethylene adipamide/hexamethylene terephthalamide copolyamide (polyamide 6,T/6,6), hexamethylene terephthalamide/hexamethylene isophthalamide (6,T/6,I), poly(m-xylylene adipamide) (polyamide MXD,6), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T), hexamethylene adipamide/hexamethylene terephthalamide/hexamethylene isophthalamide copolyamide (polyamide 6,6/6,T/6,I); poly (caprolactam-hexamethylene terephthalamide) (polyamide 6/6,T) and copolymers and blends of the same. Preferred examples of semi-aromatic polyamide resins comprised in the polyamide composition described herein include PA6,T; PA6,T/6,6, PA6,T/6,I; PAMXD,6; PA6,T/D,T and copolymers and blends of the same.

Any combination of aliphatic or semi-aromatic polyamides can be used as the polyamide for the polyamide matrix resin composition, polyamide surface resin composition, and the polyamide resin of the second component. It is within the normal skill of one in the art to select appropriate combinations of polyamides depending on the end use.

Second Component or Overmolding Component

The second component of the overmolded composite structure used to overmold the first component or composite structure is a polyamide resin composition optionally comprising a copper based heat stabilizer as described above and optionally a reinforcing agent. The one or more polyamides may be the same or different from the one or more polyamides of the first component or composite structure matrix resin and surface resin composition.

Reinforcing Agent

The polyamide resin composition of the second component may further comprise one or more reinforcing agents such as glass fibers, glass flakes, carbon fibers, mica, wollastonite, calcium carbonate, talc, calcined clay, kaolin, magnesium sulfate, magnesium silicate, barium sulfate, titanium dioxide, sodium aluminum carbonate, barium ferrite, and potassium titanate. The reinforcing agent in the second component cannot be a mat or woven fabric such as those used in the first component or composite structure. Preferably, the reinforcing agent comprises independent fibers or particles uniformly blended into the polyamide. Any reinforcing agent used in the second component must allow the polyamide resin composition to be injection or flow molded. When present, the one or more reinforcing agents are present in an amount from at or about 1 to at or about 60 weight percent, preferably from at or about 1 to at or about 40 weight percent, or more preferably from at or about 1 to at or about 35 weight percent, the weight percentages being based on the total weight of the polyamide resin composition of the second component.

Overmolded Composite Structure

Addition of surface and copper based heat stabilizers to the components of the invention improves thermal stability of the first component or composite structure and optionally of the second component during processing as well as upon use and time of the composite structure or overmolded composite structure. In addition to the improved heat stability, the presence of heat stabilizers may allow an increase of the temperature that is used during the impregnation of the fibrous material, thus reducing the melt viscosity of the matrix resin described herein. As a consequence of a reduced melt viscosity of the matrix resin, impregnation rates of the fibrous material may be increased.

The use of different heat stabilizers in the polyamide matrix resin composition and the polyamide surface resin composition of the first component or composite structure is an important aspect of the invention. The use of a copper based heat stabilizer in the polyamide matrix resin composition in combination with a surface heat stabilizer in the polyamide surface resin composition improves heat aging properties of the composite structure.

In a preferred embodiment, the surface heat stabilizer is selected from dipentaerythritol, tripentaerythritol, pentaerythritol and mixtures of these and the matrix heat stabilizer in the matrix resin composition is a copper based heat stabilizer.

The overmolded composite structure comprises a second component overmolded onto the first component or composite structure. The second component is adhered to the first component or composite structure described above over at least a portion of the top or bottom surface of the first component or composite structure, the entire top or bottom surface of the first component or composite structure, or both, or completely encapsulates the first component or composite structure. Regardless of what portion of the surface of the first component or composite structure is overmolded, the surface of the first component or composite structure that is overmolded must comprise the polyamide surface resin composition to assure good bond strength of the first and second components. The second component comprises one or more polyamide resin compositions selected from aliphatic polyamide resins, semi-aromatic polyamide resins, or combinations thereof such as those described above.

Additives

The polyamide resin of any component of the composite structure or overmolded composite structure may further comprise one or more common additives, including, without limitation, ultraviolet light stabilizers, flame retardant agents, flow enhancing additives, lubricants, antistatic agents, coloring agents (including dyes, pigments, carbon black, and the like), nucleating agents, crystallization promoting agents and other processing aids or mixtures thereof known in the polymer compounding art.

Fillers, modifiers and other ingredients described above may be present in amounts and in forms well known in the art, including in the form of so-called nano-materials where at least one of the dimensions of the particles is in the range of 1 to 1000 nm.

Preferably, any additives, including heat stabilizers but excluding fibrous materials used in the first component or composite structure of the invention, added to the polyamide resins used in any component of the composite structure and/or overmolded composite structure are well-dispersed within the polyamide resin. Any melt-mixing method may be used to combine the polyamide resins and additives of the present invention. For example, the polyamide resins and additives may be added to a melt mixer, such as, for example, a single or twin-screw extruder; a blender; a single or twin-screw kneader; or a Banbury mixer, either all at once through a single step addition, or in a stepwise fashion, and then melt-mixed. When adding the polyamide resins and additional additives in a stepwise fashion, part of the polyamide resin and/or additives are first added and melt-mixed with the remaining polyamide resin(s) and additives being subsequently added and further melt-mixed until a well-mixed or homogeneous composition is obtained.

The overmolded composite structure according to the present invention may be manufactured by a process comprising a step of overmolding the first component or composite structure with the second component. By "overmolding", it is meant that the second component is molded or extruded onto at least one portion of the surface of the first component or composite structure.

In one example of an overmolding process, the second component is injected into a mold already containing the first component or composite structure, the latter having been manufactured beforehand as described hereafter, so that the first and second components are adhered to each other over at least a portion of the surface of the first component or composite structure. The first component or composite structure is positioned in a mold having a cavity defining the outer surface of the final overmolded composite structure. The second component may be overmolded on one side or on both sides of the first component or composite structure and it may fully or partially encapsulate the first component or composite structure. After having positioned the first component or composite structure in the mold, the second component is then introduced in molten form. The two components are preferably adhered together by injection or compression molding as an overmolding step, and more preferably by injection molding.

The first component or composite structure can be made by a process that comprises a step of impregnating the fibrous material with the polyamide matrix resin composition, wherein at least a portion of the surface of the first component or composite structure comprises the polyamide surface resin composition. Preferably, the fibrous material is impregnated with the polyamide matrix resin composition by thermopressing. During thermopressing, the fibrous material(s), the polyamide matrix resin composition and the polyamide surface resin composition undergo heat and pressure in order to allow the polymers to melt and penetrate through the fibrous material and, therefore, to impregnate said fibrous material.

Typically, thermopressing is made at a pressure between 2 and 100 bars and more preferably between 10 and 40 bars and a temperature which is above the melting point of the polyamide matrix resin composition and the polyamide surface resin composition, preferably at least about 20° C. above the melting point to enable a proper impregnation. Heating may be done by a variety of means, including contact heating, radiant gas heating, infra red heating, convection or forced convection, induction heating, microwave heating or combinations thereof. Even though the polyamide compositions are in the melt state during thermopressing, the polyamide surface resin composition does not migrate from the surface to any significant degree. After thermopressing, the first component or composite structure is no longer considered a laminate structure having separate layers but a unified component structure.

Due to the improved heat stability obtained by adding a copper based heat stabilizer to the polyamide matrix resin composition in combination with a surface heat stabilizer in the polyamide surface resin composition, the temperature that is used during the impregnation of the fibrous material can be increased. The reduced melt viscosity of the polyamide matrix resin composition obtained by this increase of temperature allows a more rapid impregnation rate of the fibrous material which translates into a faster overall manufacturing cycle for the composite structure and/or overmolded composite structure. Addition of the copper halide based heat stabilizer to the polyamide matrix resin composition provides heat stability to the polyamide matrix resin composition during the impregnation.

Pressure used during the impregnation process can be applied by a static process or by a continuous process (also known as a dynamic process), a continuous process being preferred for reasons of speed. Examples of impregnation processes include without limitation vacuum molding, in-mold coating, cross-die extrusion, pultrusion, wire coating type processes, lamination, stamping, diaphragm forming or press-molding, lamination being preferred.

One example of a process used to impregnate the fibrous material is a lamination process. The first step of the lamination process involves heat and pressure being applied to the fibrous material, the polyamide matrix resin composition and the polyamide surface resin composition through opposing pressured rollers or belts in a heating zone, preferably followed by the continued application of pressure in a cooling zone to finalize consolidation and cool the impregnated fibrous material by pressurized means. Examples of lamination techniques include without limitation calendering, flatbed lamination and double-belt press lamination. When lamination is used as the impregnating process, preferably a double-belt press is used for lamination. The lamination process may comprise various layer combinations of the polyamide matrix resin composition and the fibrous material. The polyamide surface resin composition is always used as the top layer or both the top and bottom layer during the lamination process. For example, the multi-layer laminate may comprise two polyamide matrix resin composition layers, one layer of woven continuous glass fiber textile as the fibrous layer, two polyamide matrix resin composition layers, one layer of woven continuous glass fiber textile, two polyamide matrix resin composition layers, one layer of woven continuous glass fiber textile and two polyamide surface layers to make an 11 layer laminate. After impregnation of the fibrous materials using the lamination process, the end product is the first component or composite structure of the invention which can then be overmolded. A first component or composite structure prepared by this process is no longer a multi-layer laminate but a unified structure (a polymer continuum) with no discernable individual layers.

The polyamide matrix resin composition and the polyamide surface resin composition can also be applied to the fibrous material by conventional means such as for example powder coating, film lamination, extrusion coating or a combination of two or more thereof, provided that the polyamide surface resin composition is applied on at least a portion of the surface of the first component or composite structure so as to be accessible when the polyamide overmolding resin composition is applied onto at least a portion of the surface of the first component or composite structure.

During a powder coating process, a polymer powder which has been obtained by conventional grinding methods is applied to the fibrous material. The powder may be applied onto the fibrous material by scattering, sprinkling, spraying, thermal or flame spraying, or fluidized bed coating methods. Multiple powder coating layers can be applied to the fibrous material. Optionally, the powder coating process may further comprise a step which consists in a post sintering step of the powder on the fibrous material. The polyamide matrix resin composition and the polyamide surface resin composition are applied to the fibrous material such that at least a portion of the surface of the first component or composite structure comprises the polyamide surface resin composition. Subsequently, thermopressing is performed on the powder coated fibrous material, with an optional preheating of the powder coated fibrous material outside of the pressurized zone.

During film lamination, one or more films comprising the polyamide matrix resin composition and one or more films made of the polyamide surface resin composition which have been obtained by conventional extrusion methods known in the art such as for example blow film extrusion, cast film extrusion and cast sheet extrusion are applied to one or more layers of the fibrous material, e.g. by layering. The polyamide surface resin composition is again the top or bottom or both top and bottom layers of the film laminate before thermopressing. Subsequently, thermopressing is performed on the film laminate comprising the one or more films made of the polyamide matrix resin composition, the polyamide surface resin composition, and the one or more fibrous materials. During thermopressing, the films melt and penetrate around the fibrous material as a polymer continuum surrounding the fibrous material with the polyamide matrix resin. The polyamide surface resin composition remains on the surface of the first component or composite structure.

During extrusion coating, pellets and/or granulates made of the matrix resin composition and pellets and/or granulates made of the surface resin composition are melted and extruded through one or more flat dies so as to form one or more melt curtains which are then applied onto the fibrous material by laying down the one or more melt curtains in a manner similar to the film lamination procedure. Subsequently, thermopressing is performed on the layered structure to provide the first component or composite structure of the invention.

With the aim of improving bond strength between the first component or composite structure and the second component, the first component or composite structure is typically heated at a temperature close to but below the melt temperature of the polyamide matrix resin composition prior to the overmolding step and then the heated first component or composite structure is rapidly transferred into the heated mold that will be used for the overmolding step. Such a preheating step may be done by a variety of means, including contact heating, radiant gas heating, infra red heating, convection or forced convection air heating, induction heating, microwave heating or combinations thereof.

Depending on the end-use application, the first component or composite structure may be shaped into a desired geometry or configuration, or used in sheet form prior to the overmolding step. The first component or composite structure may be flexible, in which case it can be rolled and then unrolled for overmolding.

One process for shaping the first component or composite structure comprises a step of shaping the first component or composite structure after the impregnating step. Shaping the first component or composite structure may be done by compression molding, stamping or any technique using heat and/or pressure, compression molding and stamping being preferred. Preferably, pressure is applied by using a hydraulic molding press. During compression molding or stamping, the composite structure is preheated to a temperature above the melt temperature of the polyamide surface resin composition and preferably above the melt temperature of the polyamide matrix resin composition by heated means and is transferred to a forming or shaping means such as a molding press containing a mold having a cavity of the shape of the final desired geometry whereby it is shaped into a desired configuration and is thereafter removed from the press or the mold after cooling to a temperature below the melt temperature of the polyamide surface resin composition and preferably below the melt temperature of the polyamide matrix resin composition.

One problem during the manufacture of composite structures and/or overmolded composite structures is related to the thermo-oxidation and degradation of the first component or composite structure and especially the thermal degradation of the surface of the first component or composite structure during the preheating step(s) described above and during the shaping step. The present invention not only provides a first component or composite structure having good heat stability but also provides a first component or composite structure having excellent bond strength to the second component. This leads to composite structures and/or overmolded composite structures that resist degradation of mechanical performance during exposure to high temperature operational manufacturing environments and provides excellent long term flexural strength (bond strength).

With the aim of improving adhesion between the first component or composite structure and second component of the overmolded composite structure, the surface of the first component or composite structure may be a textured surface so as to increase the relative surface available for overmolding. Such textured surfaces may be obtained during the shaping step by using a press or a mold having for example porosities or indentations on its surface.

Alternatively, a one step process comprising the steps of shaping and overmolding the first component or composite structure in a single molding station may be used. This one step process avoids the step of compression molding or stamping the first component or composite structure in a mold or press and avoids the optional preheating step and the transfer of the preheated first component or composite structure to the molding station or cavity. During this one step process, the first component or composite structure is heated outside, adjacent to or within the molding station at a temperature at which the first component or composite structure is conformable or shapable during the overmolding step, preferably the first component or composite structure is heated to a temperature above its melt temperature. The shape of the first component or composite structure is conferred by the mold followed by overmolding.

The composite structures and/or overmolded composite structures according to the present invention may be used in a wide variety of applications such as for example components for automobiles, trucks, commercial airplanes, aerospace, rail, household appliances, computer hardware, portable hand held electronic devices, recreation and sports equipment, structural component for machines, buildings, photovoltaic equipment or mechanical devices.

Examples of automotive applications include, without limitation, seating components and seating frames, engine cover brackets, engine cradles, suspension arms and cradles, spare tire wells, chassis reinforcement, floor pans, front-end modules, steering column frames, instrument panels, door systems, body panels (such as horizontal body panels and door panels), tailgates, hardtop frame structures, convertible top frame structures, roofing structures, engine covers, housings for transmission and power delivery components, oil pans, airbag housing canisters, automotive interior impact structures, engine support brackets, cross car beams, bumper beams, pedestrian safety beams, firewalls, rear parcel shelves, cross vehicle bulkheads, pressure vessels such as refrigerant bottles, fire extinguishers, and truck compressed air brake system vessels, hybrid internal combustion/electric or electric vehicle battery trays, automotive suspension wishbone and control arms, suspension stabilizer links, leaf springs, vehicle wheels, recreational vehicle and motorcycle swing arms, fenders, roofing frames and tank flaps.

Examples of household appliances include without limitation washers, dryers, refrigerators, air conditioning and heating. Examples of recreation and sports include without limitation inline-skate components, baseball bats, hockey sticks, ski and snowboard bindings, rucksack backs and frames, and bicycle frames. Examples of structural components for machines include electrical/electronic parts such as for example housings for hand held electronic devices, and computers.

Preferably, the composite structures and/or overmolded composite structures of the invention are used as under the hood automotive components where high temperature environments exist.

EXAMPLES

The following materials were used for preparing examples (abbreviated as "E" in the table) of composites structures according to the present invention and comparative examples (abbreviated as "C" in the table) of composite structures.

Polyamide 1 (PA1): polyamide comprising adipic acid and 1,6-hexamethylenediamine with a weight average molecular weight of around 32000 Daltons and is commercially available from E. I. du Pont de Nemours and Company as PA66. PA1 has a melting point of about 260° C. to about 265° C. and a glass transition of about 40° C. to about 70° C., measured by DSC Instrument first heating scan at 10° C./min.

Polyhydric alcohol based heat stabilizer (DPE): dipentaerythritol commercially available from Perstorp Speciality Chemicals AB, Perstorp, Sweden as Di-Penta 93.

Copper based heat stabilizer (CuI/KI): a blend of 7-1-1 (by weight) blend of potassium iodide, cuprous iodide, and aluminum stearate, available from Ciba Specialty Chemicals.

Preparation of Films

Matrix resin compositions and surface resin compositions of example E1 and comparative examples C1, C2 and C3 shown in Table 1 were melted or melt-blended in a twin-screw extruder at about 280° C. The melted or melt-blended polyamide compositions (Table 1) were made into films by exiting the extruder through an adaptor and a film die at about 280° C. and cast onto a casting drum oil-heated at 100° C., then drawn in air and wound around a core at room temperature. The matrix and surface resin compositions were made into about 250 micron thick films. The thickness of the films was controlled by the rate of drawing.

Preparation of the Composite Structures

Preparation of the Composite Structures_E1, C1, C2 and C3 in Table 1 was accomplished by laminating multiple layers of film of compositions shown in Table 1, and woven continuous glass fiber textile (prepared from E-glass fibers having a diameter of 17 microns, sized with 0.4% of a silane-based sizing agent and a nominal roving tex of 1200 g/km that have been woven into a 2/2 twill (balanced weave) with an areal weight of 600 g/m$^2$) in the following sequence: two layers of film of surface resin composition, one layer of woven continuous glass fiber textile, two layers of film of matrix resin composition, one layer of woven continuous glass fiber textile, two layers of film of matrix resin composition, one layer of woven continuous glass fiber textile, and two layers of film of surface resin composition.

The Composite Structures were compression molded by a Dake Press (Grand Haven, Mich.) Model 44-225, Pressure range 0-25 KT, with an 8 inch platten. A 6×6" specimen of film and glass textile layers as described above was placed in the mold and heated to a temperature of about 320° C., held at the temperature for 2 minutes without pressure, then pressed at the 320° C. temperature with the following pressures: about 6 bar for about 2 minutes, then with about 22 bar for about 2 additional minutes, and then with about 45 bar for about 2 additional minutes; it was subsequently cooled to ambient temperature. The thusly formed composite structure had a thickness of about 1.6 mm. The composite structures had melting ranges between about 245° C. (onset of melting) to about 268° C. (completion of melting) with melting peaks at about 260° C. to about 265° C., measured by DSC Instrument first heating scan at 10° C./min.

Heat Ageing

The laminates were cut into ½" (about 12.7 mm) by 3" (about 76 mm) long test specimens (bars) using a MK-377 Tile Saw with a diamond edged blade and water as a lubricant. Half of the specimens were then heat aged in a re-circulating air oven at 210° C. for 500 hrs.

Flex Strength of Composite Structures of Table 1

Flexural Strength was tested on the heat aged test specimens via a 3-point bend test. The apparatus and geometry were according to ISO method 178, bending the specimen with a 2.0" support width with the loading edge at the center of the span. The tests were conducted with 1 KN load at 2 mm/min until fracture. The results are shown in Table 1, along with test results from the specimens that were not heat aged. The % retention of flex strength after heat aging is also recorded in Table 1. It is seen in Table 1 that example E1 containing the copper based heat stabilizer in the matrix resin composition and DPE in the surface resin composition retains flexural strength after being heat aged in air at 210° C. for 500 hours (39% flexural strength retention). In contrast, comparative examples C1, C2 and C3 containing respectively, DPE in both the matrix and surface resin composition (C1), both copper based heat stabilizer and DPE in both the matrix and the surface resin composition (C2) and no heat stabilizers (C3) lose more bond strength after heat aging in air at 210° C. for 500 hours.

TABLE 1

|  | E1 | C1 | C2 | C3 |
|---|---|---|---|---|
| Matrix Resin Composition | | | | |
| PA1 | 99.0 | 98.5 | 98.75 | 100.0 |
| DPE |  | 1.5 | 0.75 |  |
| CuI/KI | 1.0 |  | 0.5 |  |
| Surface Resin Composition | | | | |
| PA1 | 98.5 | 98.5 | 98.75 | 100.0 |
| DPE | 1.5 | 1.5 | 0.75 |  |
| CuI/KI |  |  | 0.5 |  |
| Flex Strength of laminate ISO-178 (Mpa) | | | | |
| As laminated | 528 | 504 | 402 | 360 |
| After 500 hrs in air oven at 210° C. | 205 | 161 | 119 | 63 |
| % Retention | 39 | 32 | 30 | 18 |

What is claimed is:

1. A composite structure comprising:
a polyamide matrix resin composition comprising
from 0.1 to at or about 3 weight percent of a copper based heat stabilizer based on the weight of the polyamide matrix resin composition;
a fibrous material selected from woven or non-woven structures, felts, knits, braids, textiles, fibrous battings or mats, and combinations of these;
and
a polyamide surface resin composition comprising
0.1 to 3 weight percent of a surface heat stabilizer based on the weight of the polyamide surface resin composition;
wherein:
the surface heat stabilizer is not a copper based heat stabilizer and does not contain copper or copper ions;
the surface heat stabilizer is a polyhydric alcohol selected from the group consisting of pentaerythritol, dipentaerythritol, tripentaerythritol, di-trimethylopropane, D-mannitol, D-sorbitol, xylitol and mixtures thereof; and
wherein the fibrous material is impregnated with the polyamide matrix resin composition.

2. The composite structure of claim 1 wherein the polyamide in the matrix resin composition and the polyamide in the surface resin composition, are independently selected from the group consisting of PA6; PA11; PA12; PA4,6; PA6,6; PA,10; PA6,12; PA10,10; PA6T, PA6I, PA6I/6T, PA6,T/6,6; PAMXD6; PA6T/DT and copolymers and blends of the same.

3. The composite structure of claim 1 wherein the surface heat stabilizer is selected from the group consisting of dipentaerythritol, tripentaerythritol, pentaerythritol and mixtures thereof.

4. The composite structure of claim 1 wherein the copper based heat stabilizer is a mixture of 10 to 50 weight percent copper halide, 50 to 90 weight percent potassium iodide, and from zero to 15 weight percent metal stearate.

5. The composite structure of claim 1 wherein the fibrous material is from 30 weight percent to 60 volume percent of the composite structure.

6. The composite structure according to claim 1 wherein the surface resin composition and/or the matrix resin composition further comprise one or more impact modifiers, one or more oxidative stabilizers, one or more reinforcing agents, one or more ultraviolet light stabilizers, one or more flame retardant agents or mixtures thereof.

7. An article made from the composite structure claim 1.

8. The article of claim 7 in the form of components for automobiles, trucks, commercial airplanes, aerospace, rail, household appliances, computer hardware, hand held devices, recreation and sports, structural component for machines, structural components for buildings, structural components for photovoltaic equipment or structural components for mechanical devices.

9. The article of claim 7 in the form of automotive powertrain covers and housings, engine cover brackets, steering columns frame, oil pans, and exhaust system components.

10. An overmolded composite structure comprising:
the composite structure of claim 1
and
a second component comprising
a polyamide resin composition
and
optionally a reinforcing agent selected from glass fibers, carbon fibers, glass beads, and aramid fibers;
and overmolded onto said first component;
wherein the second component is adhered to at least part of the surface of the first component.

* * * * *